(12) United States Patent
Chen

(10) Patent No.: US 6,860,449 B1
(45) Date of Patent: Mar. 1, 2005

(54) HYBRID FLYING WING

(76) Inventor: Zhuo Chen, 3196 Mount Zion Rd., APT 908, Stockbridge, GA (US) 30281

( * ) Notice: Subject to any disclaimer, the term of this patent is extended or adjusted under 35 U.S.C. 154(b) by 181 days.

(21) Appl. No.: 10/197,358

(22) Filed: Jul. 16, 2002

(51) Int. Cl.[7] .............................................. B64C 29/00
(52) U.S. Cl. .......................... 244/12.1; 244/5; 244/26; 244/6; 244/12.4; 244/12.6
(58) Field of Search ............................ 244/12.1, 5, 26, 244/6, 12.4, 12.6, 4 R

(56) References Cited

U.S. PATENT DOCUMENTS

| | | |
|---|---|---|
| 1,005,988 A | 10/1911 | Maris |
| 1,130,623 A | 3/1915 | Mustonen |
| 1,388,770 A | 8/1921 | Sharpnack |
| 1,667,002 A | 4/1928 | Hall |
| 1,700,107 A | 1/1929 | Pupp |
| 1,801,834 A | 4/1931 | Allen |
| 1,806,470 A | 5/1931 | Kopikowski |
| 1,833,033 A | 11/1931 | Ortega |
| 1,860,087 A | 5/1932 | Fehrenbach |
| 1,897,756 A | 2/1933 | Hahn |
| 2,384,893 A | 9/1945 | Crook |
| 2,412,285 A | 12/1946 | Peck |
| 3,139,244 A | 6/1964 | Bright |
| 3,486,719 A | 12/1969 | Fitzpatrick |
| 3,807,661 A | 4/1974 | Ikeda |
| 3,856,238 A * | 12/1974 | Malvestuto, Jr. ................ 244/5 |
| 3,869,102 A | 3/1975 | Carroll |
| RE28,454 E | 6/1975 | Fitzpatrick |
| 3,907,218 A | 9/1975 | Miller |
| 3,913,871 A | 10/1975 | Miller |
| 3,993,268 A | 11/1976 | Moore |
| 4,052,025 A | 10/1977 | Clark |
| 4,149,688 A | 4/1979 | Miller, Jr. |
| 4,165,058 A | 8/1979 | Whitener |
| 4,478,378 A | 10/1984 | Capuani |
| 4,591,112 A | 5/1986 | Piasecki |
| 4,889,297 A | 12/1989 | Ikeda |
| 5,026,003 A | 6/1991 | Smith |
| 5,034,751 A | 7/1991 | Miller, Jr. |
| 5,071,088 A | 12/1991 | Betts |
| 5,242,132 A | 9/1993 | Wukowitz |
| 5,320,305 A | 6/1994 | Oatway |
| 5,383,627 A | 1/1995 | Bundo |
| 5,454,531 A * | 10/1995 | Melkuti ..................... 244/12.6 |
| 5,518,205 A | 5/1996 | Wurst et al. |

(List continued on next page.)

FOREIGN PATENT DOCUMENTS

| | | |
|---|---|---|
| DE | 4217374 | 12/1993 |
| FR | 2 612 878 | 3/1987 |
| FR | 2623468 | 11/1987 |
| JP | 01052448 | 3/1999 |
| WO | WO 89/10868 | 11/1989 |
| WO | WO 91/01917 | 2/1991 |

OTHER PUBLICATIONS

US 5,823,968, 10/1998, Bothe (withdrawn)

*Primary Examiner*—Michael J. Carone
*Assistant Examiner*—Rick Palabrica

(57) ABSTRACT

An aircraft has a flying wing and two wingtip hulls installed on the wingtips of the flying wing. Both of the wingtip hulls contain lighter-than-air gas to generate static lift. These wingtip hulls not only contribute to lift-generating but also help the aircraft achieve roll stability and control. Forward propulsion systems are installed at the upper-front positions of the flying wing. When vertical and/or short take-off and landing (V/STOL) capability is required, one or more lift-fan propulsion systems can be installed on the flying wing. The lift-fan propulsion systems can either be driven by their own engines or by the power transmitted from the forward propulsion systems. Payload can be carried inside the flying wing or be hung under or held above the flying wing.

2 Claims, 12 Drawing Sheets

U.S. PATENT DOCUMENTS

| | | |
|---|---|---|
| 5,810,284 A | 9/1998 | Hibbs |
| 5,813,628 A | 9/1998 | Hahl |
| 5,823,468 A * | 10/1998 | Bothe .......................... 244/2 |
| 5,909,858 A | 6/1999 | Hawley |
| 6,029,929 A | 2/2000 | Blum |
| 6,098,922 A | 8/2000 | Hahl |
| 6,196,498 B1 | 3/2001 | Eichstedt |
| 6,286,783 B1 | 9/2001 | Kuenkler |
| 6,311,925 B1 | 11/2001 | Rist |
| 2002/0003190 A1 | 1/2002 | Sankrithi |
| 2002/0014555 A1 | 2/2002 | Smith |

* cited by examiner

HYBRID FLYING WING

CROSS-REFERENCE TO RELATED APPLICATIONS

Not Applicable

FEDERALLY SPONSORED RESEARCH

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION—FIELD OF INVENTION

The invention relates to the field of aircraft and, in particular, to aircraft incorporating both aerodynanic and static lift.

BACKGROUND OF THE INVENTION—DESCRIPTION OF PRIOR ART

Aircraft has been serving the world for about 100 years and proven useful in many applications. Yet, no existing aircraft can cost-effectively deliver substantial payload up to hundreds or even thousands tons of payload over a long distance to a place that only has a short, rough, and dirt runway or does not have a runway at all. The following paragraphs explain why prior art cannot fulfill this need.

Tube-And-Wing Aircraft

Modern transport aircraft are of tube-and-wing design. Antonov AN-225, the biggest modem transport aircraft, can carry 250 tons (550,782 pounds) of payload. However, a major shortcoming of the tube-and-wing design makes it technically difficult to build even bigger aircraft. That is, load of a tube-and-wing aircraft is concentrated in the middle portion of its wing. In order to carry the load, the wing must transfer its lift to its middle portion. This causes high level of stress over the wing structure. The stress becomes even greater for aircraft with heavy payload and makes the tube-and-wing design structurally inefficient for aircraft with substantial payload.

In addition, transportation aircraft of tube-and-wing design are very difficult to realize vertical and/or short take-off and landing (V/STOL), especially for aircraft of heavy payload. Although Boeing C-17 can take off from a 2,315 meters (7,600 feet) long rough, dirt runway, it can only carry 72.6 tons (160,000 pounds) of payload to achieve this take-off distance and is very expensive at an average unit price of $198 million (1999 dollars).

Blended Wing Body Aircraft and Related Concepts

The blended wing body (BWB) design currently being developed by Boeing and other companies greatly reduces the above-mentioned stress over wing structure. However, BWB aircraft needs large wingspan to gain roll stability and control as well as achieve high lift-to-drag ratio (LID). The large wingspan makes a large BWB aircraft difficult to move around in small or crowded airports. In addition, all of the weight of a BWB aircraft is supported by the ground when moves around in airport. This weight makes a big BWB aircraft of substantial payload either has to carry large and heavy landing gears to move on unprepared runways or be restricted to take-off and land in a limited number of big airports. Thirdly, BWB aircraft with heavy payload are difficult to achieve V/STOL.

Lighter-Than-Air Aircraft

Lighter-than-air aircraft need extensive ground support to anchor the aircraft on the ground and load/unload. For example, CL-160, the airship with 160 tons (352,501 pounds) payload capability being developed by CargoLifter AG of Germany, needs a ground support system to control the amount of water in its ballast system for loading/unloading. In addition, the huge size and buoyant nature of lighter-than-air aircraft make it difficult to control under windy weather conditions.

Both U.S. Pat. No. 5,026,003 of Smith and Patent WO 89/10868 of Beggs use a device to connect two parallel, separated compartments containing lighter-than-air gas. The device for U.S. Pat. No. 5,026,003 is a platform and for Patent WO 89/10868 is a gondola. These devices do not generate aerodynamic lift. Both inventions cannot resolve the above-mentioned shortcomings of lighter-than-air aircraft. They still need extensive ground support to anchor and load/unload. In addition, they are difficult to control under windy weather conditions.

Patent FR 2612878 of Fremont is an invention, as mentioned in its abstract, "composes of a central wing, flanked like a catamaran by two slender balloons, providing it with positive lift in hovering flight. It is intended for pulling a train of balloons, or any other flying, rolling or floating vehicle." The central wing of this invention is not used for carrying payload but for pulling objects and flight control. In addition, as the static lift of the balloons is enough to sustain the aircraft during hovering flight, the aircraft does not need the central wing to generate positive lift to sustain its flight.

Existing Concepts for Aircraft Combining Static and Aerodynamic Lift

Aircraft combining static and aerodynamic lift is a prominent concept to build an aircraft that can cost-effectively carry substantial payload over a long distance and still have V/STOL capability. However, existing inventions cannot utilize static and aerodynamic lift to a degree that the means for generating both kinds of lift can effectively and efficiently benefit from each other and the aircraft can be easy to control, cost-effective to operate, and easy to develop and build.

U.S. Pat. No. 5,823,468 of Bothe is an invention utilizing a lifting body to carry payload and hold lighter-than-air gas. The lifting body generates both static and aerodynamic lift. Either a title propulsion system or a system combined with vertical lift fans installed on both sides of the lifting body and a tail-mounted forward propulsion system can be used on this aircraft. This design is not efficient in horizontal flight because its lifting body makes high induced-drag while generating aerodynamic lift. This is because the lifting body constitutes a wing of low aspect-ratio, and it is well known that the lift-to-drag ratio (LID) of a wing decreases as its aspect-ratio decreases.

In addition, an aircraft of this invention is very difficult to control. When using the tilt propulsion system, the four tilt prop-rotors have to perform multiple functions to maintain and control the aircraft while flying. During vertical flight, these prop-rotors have to perform three functions: to generate enough vertical lift to lift the aircraft, control the balance of the aircraft, and maneuver the aircraft laterally and longitudinally. Then, they have to do another three functions during the transition between vertical and horizontal flights. That is, while balancing the aircraft and providing enough lift to hold the aircraft, the tilt proprotors have to tilt to transit the aircraft between vertical and horizontal flights. Finally, still another three functions during horizontal flight: to provide forward propulsion, tilt to a certain angle to balance the aircraft, and control the aircraft to maneuver. There are simply too many functions for the tilt prop-rotors to perform in every portion of flight and such a propulsion system must be complex, costly to develop, and difficult to operate and maintain.

Finally, both the two kinds of propulsion systems of this invention make an aircraft of this design structurally inefficient. When using vertical lift fans and a forward propulsion system, the invention requires a large number of lift fans being installed along the right and left side of the aircraft. The large number of lift fans not only add a significant amount of weight to the aircraft but also increase the complexity of both the propulsion and flight control systems. That is, either an engine or a motor has to be installed to each of the lift fans or a power transmission mechanism should be provided to each of them. Such a big number of lift funs and the complexity of the propulsion and control systems make the aircraft structurally heavy, costly to build, and difficult to maintain. When using the four tilt prop-rotors propulsion system, the four tilt-able outriggers have to bear a significant amount of load during both vertical flight and the transition flight between vertical and horizontal flights. Such a concentration of load makes the four tilt-able outriggers structurally heavy. This concentration of load also makes the overall aircraft structure be arranged in a way that a significant portion of the aircraft's load should be transferred to these four tilt-able outriggers. Such a structure arrangement also adds weight to the aircraft structure.

U.S. Pat. No. 6,286,783 B1 of Kuenkler has similar problems of that of U.S. Pat. No. 5,823,468 as mentioned in the above three paragraphs. This invention is also based on a low aspect-ratio lifting body that has high induced-drag during horizontal flight. Its propulsion system is composed of four tilt-able propulsion units. For the same reasons mentioned above about the tile-able prop-rotors of U.S. Pat. No. 5,823,468, the four tilt-able propulsion units of invention U.S. Pat. No. 6,286,783 B1 make the aircraft difficult to control and structurally inefficient.

U.S. Pat. No. 6,196,498 B1 of Eichstedt is an invention using a non-rigid, semi-buoyant lifting body to carry payload, hold lifting gas, and generate aerodynamic lift. This design still has high induced-drag during horizontal flying because its semi-rigid lifting body has low aspect-ratio. This invention also cannot make an aircraft achieve vertical take-off and landing (VTOL).

U.S. Pat. No. 4,052,025 of Clark is an invention that has a huge fuselage carrying payload and lifting gas and has a large wing installed on the fuselage just like a tube-and-wing aircraft. The design is structurally inefficient similar to a tube-and-wing aircraft because a big portion of load of the fuselage should be transferred to the middle portion of the wing and the wing structure should transfer the wing lift to the middle wing as well. The design also does not have VTOL capability.

U.S. Pat. No. 3,856,238 of Malvestuto is an invention that uses a plurality of wings installed in tandem between two compartments containing lighter-than-air gas. On the trailing edge of each of the wings, a plurality of rotors are installed in such a way that when the rotors rotate, the airflows passing through the wings and the rotors can affect each other and generate both vertical lift and forward propulsion. This design is structurally heavy and difficult to control because first, the large number of rotors need complicated power transmission and control systems; second, installing rotors on the trailing edge, the thinnest and slenderest portion of the wings, makes the wing structurally heavy.

U.S. Pat. No. 3,913,871 of Miller is an invention that has two lighter-than-air compartments installed on the upper side of the left and right wings of a tube-and-wing aircraft. These two lighter-than-air components also connect to the horizontal tails of the aircraft to provide structural rigidity. The principal object of the invention is to provide improvements in heavier-than air passenger aircraft so that the aircraft can safely carry a large passenger payload particularly at high speeds. Although this design makes a tube-and-wing aircraft have a smaller wing than conventional tube-and-wing aircraft, the structural disadvantages of tube-and-wing design remain. The wing structure has to transfer both the aerodynamic lift and the static lift to the middle portion of the wing, and the fuselage structure has to transfer load to the middle wing as well. In addition, the design does not have VTOL capability. Another shortcoming of the invention is that, the two lighter-than-air compartments generate high drag during high-speed flight, which makes the aircraft require bigger and heavier propulsion systems of higher thrust comparing with aircraft that can fly at similar speed but do not have the lighter-than-air compartments.

U.S. Pat. No. 3,907,218 of Miller is an invention about an aircraft having three parallel lighter-than-air compartments installed on top of a freight compartment, and a pair of wings installed on the left and right side of the freight compartment. This design has high drag during flying because its non-lift-generating freight compartment has a flat and long shape, which has big wetted area for generating drag. The design also does not have VTOL capability.

Rotary Wing Aircraft and Related Concepts

Helicopters have excellent VTOL capability. However, the concentration of load onto a few number of rotor hubs makes helicopters structurally inefficient when carrying substantial payload. In addition, the fact that a significant portion of engine power is consumed to generate vertical lift during horizontal flight makes helicopters economically inefficient when flying over a long distance. Attempts have been made to increase forward flying efficiency by adding fixed wings to helicopters. However, these attempts cannot resolve the above-mentioned structural disadvantage of load concentration because the rotors still generate all the lift during VTOL.

Tilt rotor aircraft like V-22 has the same structural disadvantage as helicopters, which is a significant shortcoming when carrying substantial payload. In addition, a complex control system is required to balance the aircraft while tilting and controlling the rotors. Such a control system is costly to develop. The tilt rotors also have a complex mechanical system to transfer power between two tilt-able rotors to ensure safety during hovering and VTOL. This mechanical system is heavy and increases the cost and maintain burden of the aircraft.

BRIEF SUMMARY OF THE INVENTION

The fundamental object and advantage of my invention is to build an aircraft that is highly flexible and cost-effective in transporting payload. Specifically, the objects and advantages of an aircraft based on my invention are:

1. Can cost-effectively fly over long distances;
2. Can cost-effectively achieve V/STOL;
3. Can transport substantial payload of large dimensions;
4. Can taxi and move around on unprepared, unpaved grounds;
5. Can achieve high structural efficiency with low-cost, conventional structures made of lowcost, conventional materials;
6. Can achieve effective flight control with systems that are easy to develop and operate.

An aircraft has been invented to fulfill the above-mentioned objects. The invention has a central wing. On each of the two wingtips of the central wing, a wingtip hull is installed. Both of the wingtip hulls contain lighter-than-air gas to generate static lift.

Payload can be carried inside the wing and/or under/above the wing. Forward propulsion systems are installed on the wing. Vertical propulsion systems for V/STOL can be installed on the wing if V/STOL capability is required. The vertical propulsion systems can either use their own engines or the power transmitted from the forward propulsion systems. The wing also has flaperons, or ailerons and flaps to adjust lift and control the flying attitude of the aircraft.

The following paragraphs explain how my invention can achieve the above-mentioned six objects and advantages.

First, this invention can make an aircraft cost-effectively fly over long distances. During horizontal flight, the wingtip hulls can effectively reduce the wing's induced drag by blocking and weakening the lift-induced wingtip vortexes. For the same reason, the wingtip hulls can also help to make the wing have a lower aspect-ratio comparing with tube-and-wing transport aircraft. In addition, by installing forward propulsion systems on the upper-front of the wing, the high-speed airflows generated by the propellers of the propulsion systems can pass through the upper surface of the wing. Fenced by the walls of the wingtip hulls, these high-speed airflows can expand the boundary layer over the upper surface of the wing and help the wing maintain high lift even when the aircraft is flying at low speeds. All these features can make the wing generate enough aerodynamic lift with a high lift-to-drag ratio (L/D) to achieve efficient horizontal flying.

Second, The invention can make an aircraft cost-effectively achieve V/STOL. The thick wing can house lift-fan propulsion systems that have multiple stages of rotors and stators, which can make the lift-fans efficiently generate huge lift. Movable louver-covers are installed at the bottom of the lift-fan propulsion systems so that when these louver-covers are closed, they can form the lower surface of the wing and when they are open, they can vector the thrust generated by the lift-fans. Covers are also installed on the top of the lift-fan propulsion systems so that when the covers are closed, they can form the upper surface of the wing and when they are open, they can allow air going into the lift-fan propulsion systems. The aircraft can have one or more lift-fan propulsion systems installed in the wing and these lift-fans can either be driven by power transmitted from the forward propulsion systems or by their own engines. The dynamic lift generated by the lift-fan propulsion systems and the static lift generated by the wingtip hulls can make the aircraft achieve VTOL.

During the transition from vertical take-off to horizontal flight, the louver-covers at the bottom of the lift-fan propulsion systems can be adjusted so that the lift-fan thrust can be vectored backward. After gaining enough horizontal speed, the lift-fans can be stopped and the covers at both the top and bottom of the lift-fan propulsion systems can be closed to form the wing surfaces. These lift-fan propulsion systems can also make the aircraft achieve short take-off or "jump take-off" by vectoring the lift-fan thrust to a certain angle during take-off run.

Third, the invention can make an aircraft transport substantial payload of large dimensions. The high-thickness wing makes the wing capable of having huge internal spaces for carrying payload of large dimensions. In addition, payload can also be hung under the wing and/or held above the wing, making even less restrictions to the dimensions of payload. One application utilizing this invention's capability of carrying huge payload is to hang a space shuttle under the wing, lift it to a high altitude in the air, and release and launch it.

Forth, this invention can make an aircraft taxi and move around on unprepared, unpaved grounds. The static lift generated by the wingtip hulls can prevent a portion of the aircraft's weight from passing onto the ground. In addition, the large wingtip hulls can house landing gears with large size tires, which can ensure low intensity of pressure being applied onto the ground surface. All these can make the aircraft fit to the soft surfaces of unprepared and unpaved grounds. Together with the V/STOL capability, the aircraft can take-off, land, and load/unload in many places with unprepared, unpaved grounds.

Fifth, the invention can make an aircraft achieve high structural efficiency with low cost, conventional structures made of low cost, conventional materials. By distributing payload along the wingspan, there is no significant load concentration on the aircraft structure. In addition, in both absolute and relative terms, the wing has high thickness, which further reduces structural stress by having high structural height. Such a low stress level makes conventional rib-and-spar structure made of low-cost, conventional materials capable of supporting the aircraft. Furthermore, the wing can be designed as a very simple straight wing having identical airfoil of same dimensions across the wingspan and the wingtip hulls can also be designed as a very simple tube-shape. These simple shapes further increase the structural simplicity and reduce the cost of structure because the aircraft can be constructed by some identical, simple structural elements. For example, the wing can use the same ribs across the wingspan, and the wingtip hulls can have the same cross-rings along the longitudinal axis except the head and tail portions. Finally, The aircraft's V/STOL capability also makes the landing gears have light weight because they do not need to be structurally strong to sustain the high impact load of conventional landing.

Sixth, the invention can make an aircraft achieve effective flight control with systems that are easy to develop and operate. Although payload is distributed along the wingspan, the aircraft can easily achieve roll stability because the wingtip hulls generate static lift on both wingtips preventing the aircraft from rolling. Directional stability can be achieved by drags generated by the wingtip hulls and vertical stabilizers can be installed if required. When making a turn during horizontal flight, the aircraft can make one propeller generate more thrust than another. Rudders can also be used for turning if vertical stabilizers are installed. During hovering and flying at very low speed, the lateral maneuvering fans installed on the heads and tails of the wingtip hulls can make the aircraft turn and move laterally so that it can accurately land on and hover over a specific spot on the ground. Pitch stability and control can be achieved by wing flaperons. If necessary, the pitch stability systems of airships, which consist of forward and after ballonet systems, can be used on the wingtip hulls. Horizontal stabilizers are another option to achieve pitch stability and control.

The control during V/STOL is also easy to achieve because the large wing area makes it possible to house one or more lift-fan propulsion systems. By adjusting the thrust of different lift-fan propulsion systems, the aircraft can achieve balance during hovering and flying at very low speed. If only one lift-fan propulsion system is installed, the wingtip hulls can balance the aircraft by adjusting their forward and after ballonet systems. By adjusting the angle of the moveable louvers of the louver-covers of the lift-fan propulsion systems, the aircraft can achieve the transition between hovering and horizontal flight.

BRIEF DESCRIPTION OF THE SEVERAL VIEWS OF THE DRAWING

In the drawings, closely related figures have the same number but different alphabetic suffixes.

DETAILED DESCRIPTION OF THE INVENTION—PREFERRED EMBODIMENT

General Description

FIGS. 1, 2A, 2B, and 2C show the configuration of the preferred embodiment of the Hybrid Flying Wing aircraft, also called the "aircraft", according to the invention. The aircraft is composed of a wing 34 and two wingtip hulls 30A and 30B installed on both wingtips of the wing. Wing 34 carries payload, fuel, and major systems. Forward propulsion systems 28 are installed in the upper-front of wing 34. Three lift-fan propulsion systems are installed on wing 34. The upper louver-covers 32A, 32B, and 32C for these three lift-fan propulsion systems are indicated in the figs. Right lift-fan propulsion system with its upper louver-cover 34A is positioned in the right-front side of wing 34; left lift-fan propulsion system with its upper louver-cover 34C is located in the left-front side of wing 34; center lift-fan propulsion system with its upper louver-cover 32B is positioned in the middle-rear side of wing 34. All the three lift-fan propulsion systems are shown as their upper louver covers closed, forming the upper surface of wing 34. Installed on the trailing edge of wing 34 are flaperons 36. Cockpit 26 is at the middle-front of wing 34.

The wingtip hulls 30A and 30B contain lighter-than-air gas. Lateral maneuvering fans 20A, 20B, 20C, and 20D are installed on both the heads and tails of wingtip hulls 30A and 30B. These lateral maneuvering fans can turn or laterally move the aircraft when the aircraft is hovering or flying at very low speed. Together with the forward propulsion systems, these lateral maneuvering fans can make the aircraft accurately land on and hover over a specific spot on the ground. Nose landing gear 22B and main landing gears 24B are installed on the left wingtip hull 30B. Nose landing gear 22A and main landing gears 24A are installed on right wingtip hull 30A. The landing gears have a big number of large-size, low-pressure tires to ensure the aircraft can taxi and move around on the soft surfaces of unprepared, unpaved grounds.

This configuration can achieve a high lift-to-drag ratio (L/D) and high cruise efficiency because first, the two wingtip hulls 30A and 30B can effectively reduce the induced drag of wing 34 by blocking and weakening the lift-induced wingtip vortexes generated by wing 34. Second, carrying payload and systems in wing 34 eliminates fuselage and the aerodynamic drag associated with fuselage. Third, the high-speed airflows generated by the propellers pass through the upper surface of wing 34 thus not only reduce drag by extending the boundary layer over wing 34 but also help wing 34 generate lift even at low speeds.

Lift-Fan Propulsion Systems and V/STOL

Figure 3A:
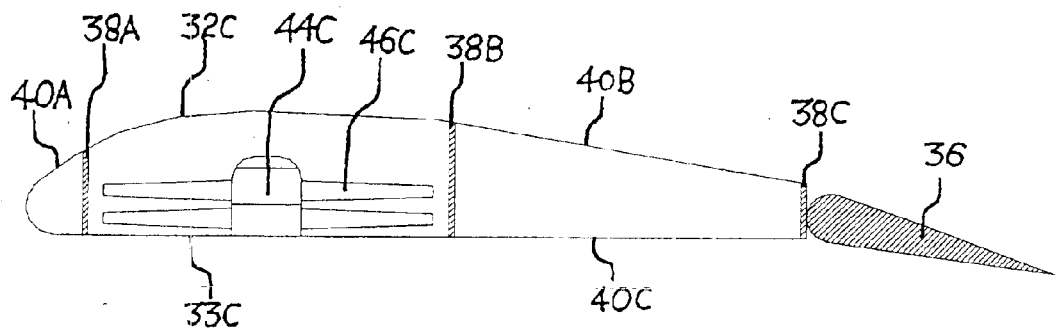
FIGS. 3A to 3C show the cross section of the airfoil and a lift-fan propulsion system, the way the covers of the lift-fan propulsion system work to vector the lift-fan thrust, and the way the covers form the wing surfaces then they are closed.
Figure 3B:
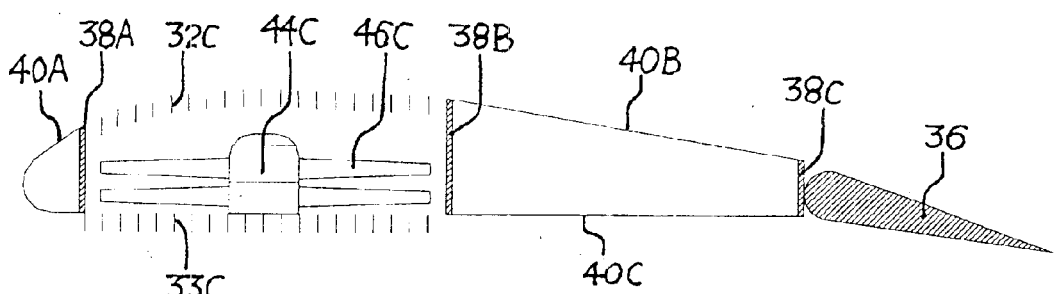
Figure 3C:
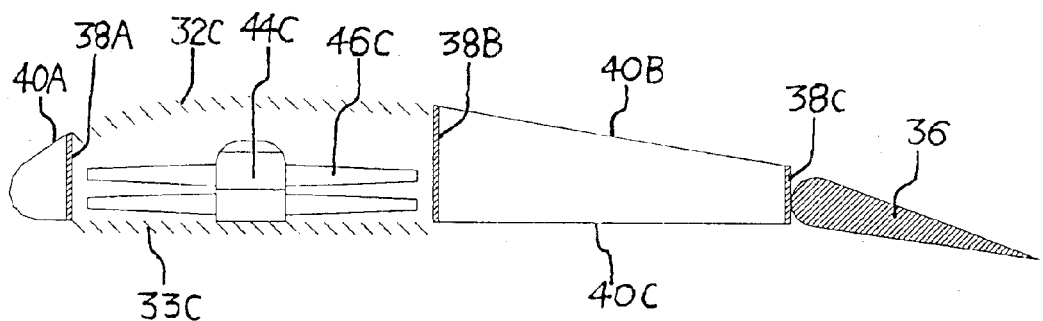

FIGS. 3A, 3B, and 3C indicate how the lift-fan propulsion systems make the aircraft achieve V/STOL and effectively transit between hovering and horizontal fights.

Figure 1:
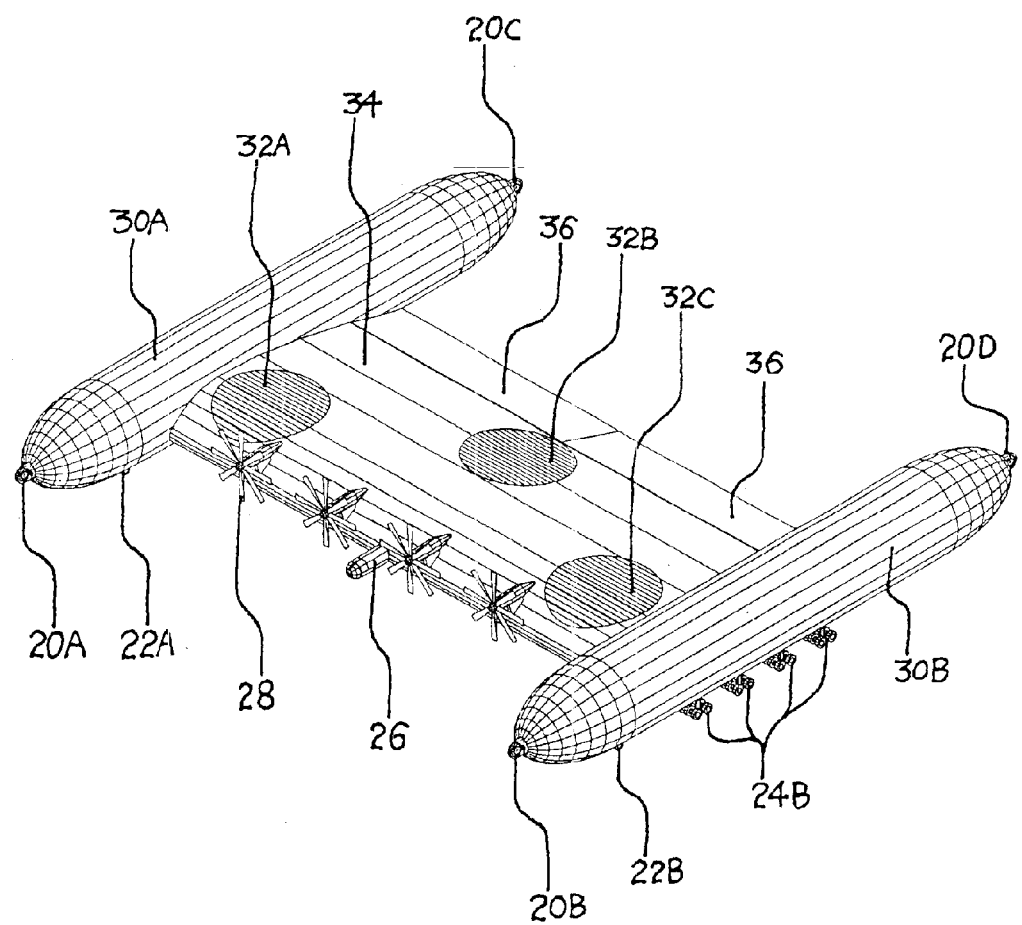
FIG. 1 shows an isometric view of an aircraft according to the invention in a cargo transport version with V/STOL capability in the condition of parking on the ground.
Figure 2A:
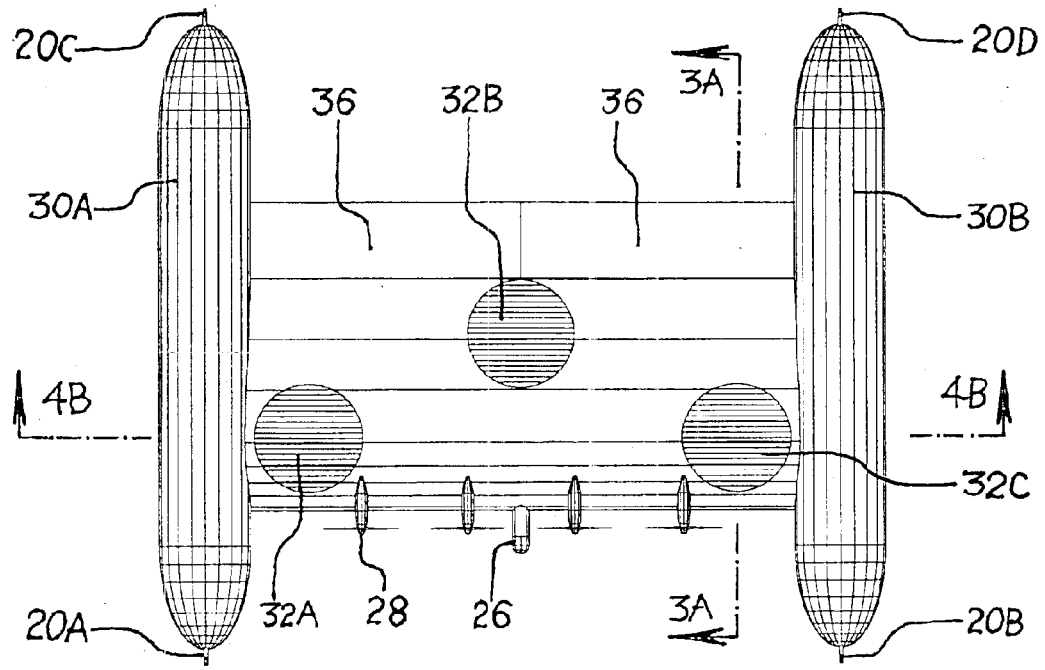
FIGS. 2A to 2C show the three views of the aircraft.

FIG. 3A is a cross-section view along line 3A—3A of FIG. 2A. As this fig indicates, left lift-fan propulsion system is installed between front wing spar 38A and middle wing spar 38B. Lift-fan hub 44C contains one or more turbo-shaft engines and a transmission system driving lift-fan rotor 46C; or instead of containing engines, lift-fan hub 44C contains a transmission system transferring the power from forward propulsion systems 28 to rotate lift-fan rotor 46C. The louvers of both upper louver-cover 42A and lower louver-cover 42B are at closed positions, forming the upper and lower surfaces of wing 34 together with front wing skin 40A, upper wing skin 40B, and lower wing skin 40C of wing 34.

FIG. 3B is a cross-section view along line 3A—3A of FIG. 2A showing the left lift-fan propulsion system when its louver-covers are opened for VTOL. The louvers of lower louver-cover 42B are opened at 90 degree from their horizontal positions to direct the airflows from the left lift-fan propulsion system to go vertically down. The louvers of upper louver-cover 42A are also opened at 90 degree from their horizontal positions to maximize the air in-take effect during VTOL.

FIG. 3C is a cross-section view along line 3A—3A of FIG. 2A showing the left lift-fan propulsion system when its louver-covers are vectoring the lift-fan thrust during transition from hovering to horizontal flying. The louvers of lower louver-cover 42B are opened at an angle less than 90 degree from their horizontal positions to direct the airflow from the lift-fan propulsion system to go both downward and backward. The louvers of upper louver-cover 42A are also opened to an angle less than 90 degree from their horizontal positions to maximize air in-take effect when the aircraft is flying at a forward speed. FIG. 3C also indicates how the lift-fan propulsion system makes the aircraft achieve short take-off or "jump take-off". That is, when the louvers of louver-cover 42A and 42B are opened as what is shown in FIG. 3C, the lift-fan propulsion system can generate both vertical lift and horizontal thrust. The horizontal thrust works together with the forward propulsion systems to push the aircraft quickly gain speed so that wing 34 generates lift. The vertical lift from the lift-fan propulsion systems works together with the wing lift and the static lift of wingtip hulls to make the aircraft take-off. By this way, the aircraft can take-off after a very short takeoff run. This "jump take-off" can be very useful when the aircraft's payload is too heavy to achieve vertical take-off.

Both right and center lift-fan propulsion systems have the same structure and work the same way as the above-mentioned left lift-fan propulsion system.

The lift-fan propulsion systems have three major advantages for V/STOL. First, the lift-fans can utilize the high thickness of wing 34 to have multiple stages of rotors and stators to achieve high thrust-generating efficiency. Second, the louver-covers can ensure that no extra drag can be generated by the lift-fan propulsion systems during cruise flight. Third, the large area of wing 34 makes it possible that multiple lift-fan propulsion systems can be installed so that the balancing of the aircraft during hovering and the transition flights between hovering and horizontal flights can be easily achieved by adjusting the thrusts of different lift-fans.

Structure and Cargo Handling

Figure 2B:
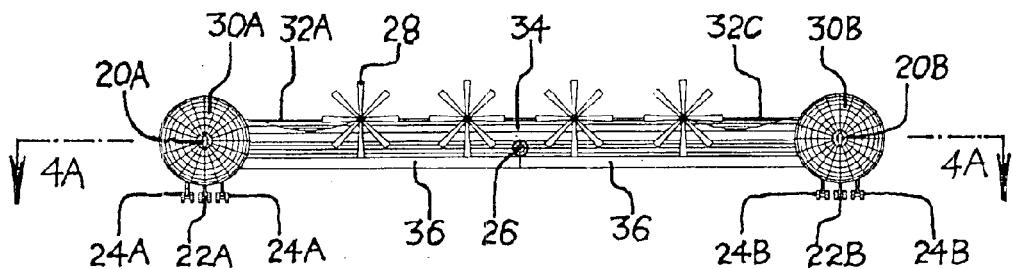
Figure 2C:
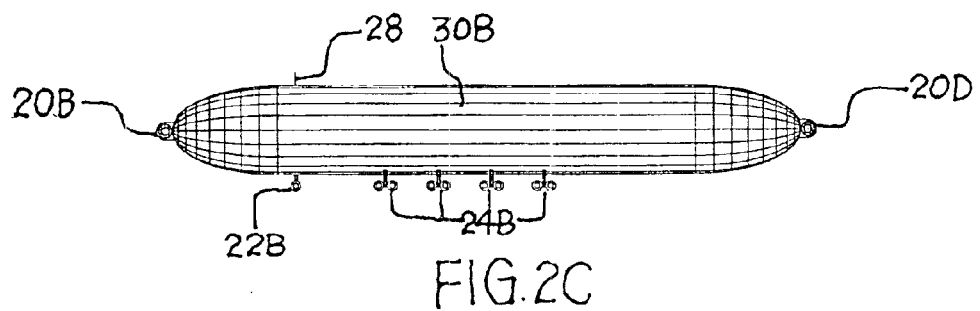
Figure 4A:
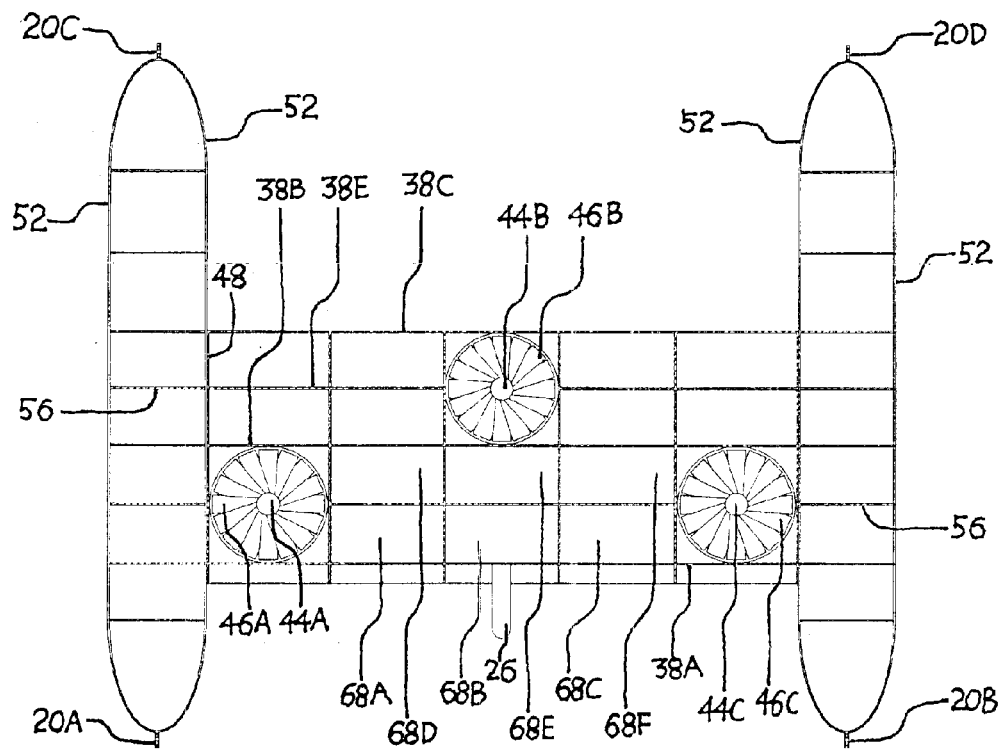
FIGS. 4A to 4B show the plan and front sectional views of the main structure of the aircraft.

FIG. 4A is a sectional plan view taken along line 4A—4A of FIG. 2B showing one of the many ways to arrange the structure of the aircraft. The big thickness and low concentration of load of wing 34 makes it possible that conventional rib-and-spar structure is a good choice to build the wing. As shown in FIG. 4A, wing 34's main structure consists of five wing spars 38A to 38E and five identical ribs, rib 48. Each of the three lift-fan propulsion systems is installed between two ribs and two wing spars so that their thrusts can be directly transferred to the wing structure. The five wing spars also connect directly to five cross-ribs 56 of both wingtip hulls 30A and 30B. Besides the cross-ribs that connect to the wing spars, both wingtip hulls also have other cross-ribs 56 along the longitudinal axis. In addition, both wingtip hulls have longitudinal girders 52. Six cargo compartments 68A to 68F are also indicated in the fig. The other compartments formed by wing spars and ribs can be used to carry fuel and install various systems of the aircraft.

Figure 4B:
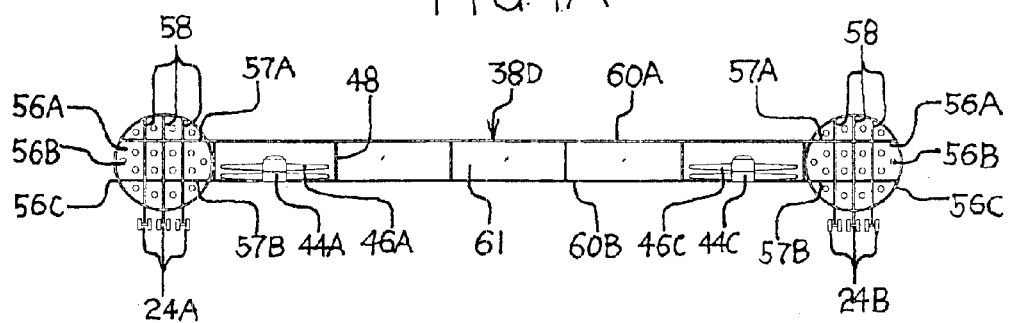

FIG. 4B is a sectional front view taken from line 4B—4B of FIG. 2A. The wing spar 38D shown in the fig is wing spar between the front wing spar 38A and middle wing spar 38B. As both the left and right lift-fan propulsion systems pass through wing spar 38D, the spar does not have spar panel 61 in the portions that both lift-fan propulsion systems pass through. However, spar panels 61 are installed in the portions where lift-fan propulsion systems do not pass through. The upper beam 60A and lower beam 60B of wing spar 38D pass through the top and bottom of the left and right lift-fan propulsion systems and connect with the cross-ribs 56 of both wingtip hulls respectively. Cross-rib 56 is constructed by ring 56C and cross-rib panel 56A. Holes 56B are made on cross ring panel 56A to reduce weight and make lighter-than-air gas able to pass through cross-rib 56. Landing gears are installed on cross-ribs and in order to transfer the load of landing gears, strengthen beams 58 are installed on cross-rib 56. Upper strengthen beam 57A and lower strengthen beam 57B are installed on cross-rib 56 to pass load onto wing spar 38D.

Figure 5A:
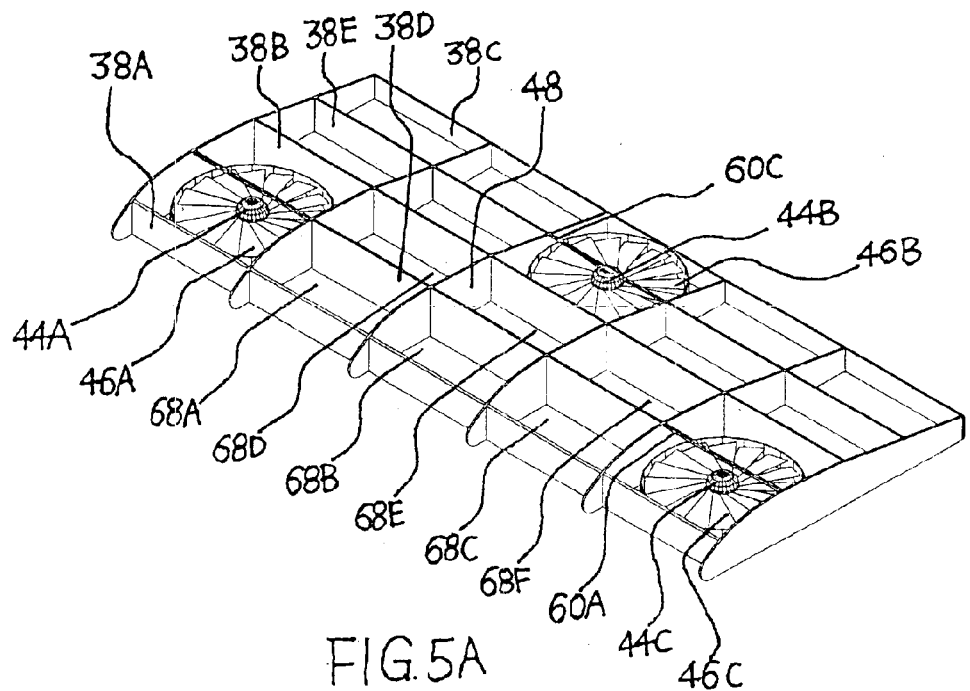
FIGS. 5A to 5B show the isometric sectional views of the arrangement of different compartments of the aircraft's wing and a system to load/unload.

FIG. 5A is an isometric view of the structure of wing 34 showing the arrangement of the six cargo compartments 68A to 68F and the three lift-fan propulsion systems.

Figure 5B:
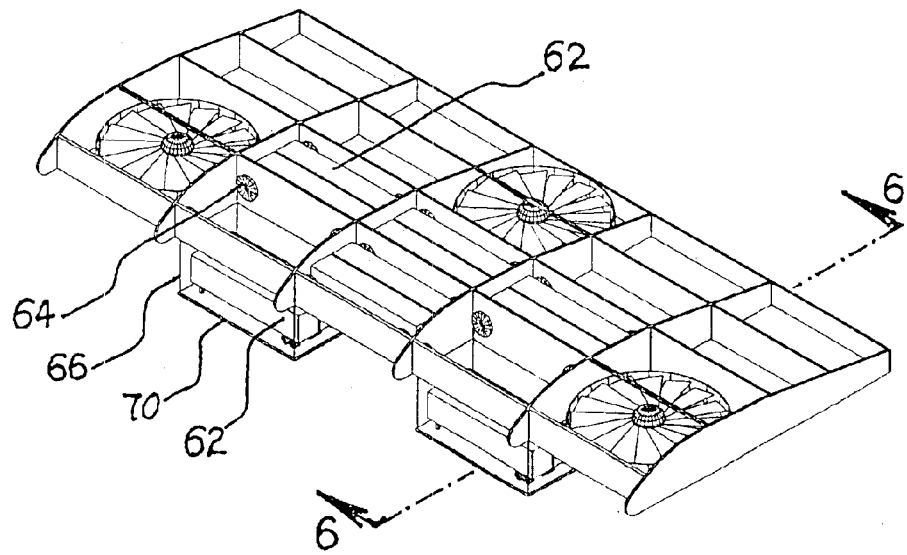

FIG. 5B is an isometric view of wing 34 showing the arrangement of cargo handling system of the aircraft. Each of cargo compartments 68A to 68F has a cargo pallet 70 that is also the lower wing panel of the cargo compartment. Cargo of large dimensions, such as the standard-size truck trailer 62 shown in the fig, can be carried on pallet 70. Pallet 70 has a structure of crosswise, lengthwise, and diagonal spars covered with lower skin and upper strengthened skin to transfer cargo load to four cables 66 that are connected to its four corners. Each of the four cables 66 connects to one corner of pallet 70 on the one end and to a cargo hoisting system 64 on the other end. When the cargo hoisting systems 64 lower pallets 70 down on the ground as shown by cargo compartment 68A and 68C, cargo can be loaded and unloaded. When the hoister systems 64 pull up pallets 70 as shown by cargo compartments 68B and 68D to 68F, pallets 70 are locked onto the wing spars and ribs, forming each compartment. By this way, load of cargo can be passed onto the wing structure and the pallets form the lower panels of wing 34 under the cargo compartments. In FIG. 5B, each of the six cargo compartments carries two standard-size truck trailers and in total the aircraft carries 12 trailers.

Figure 6:
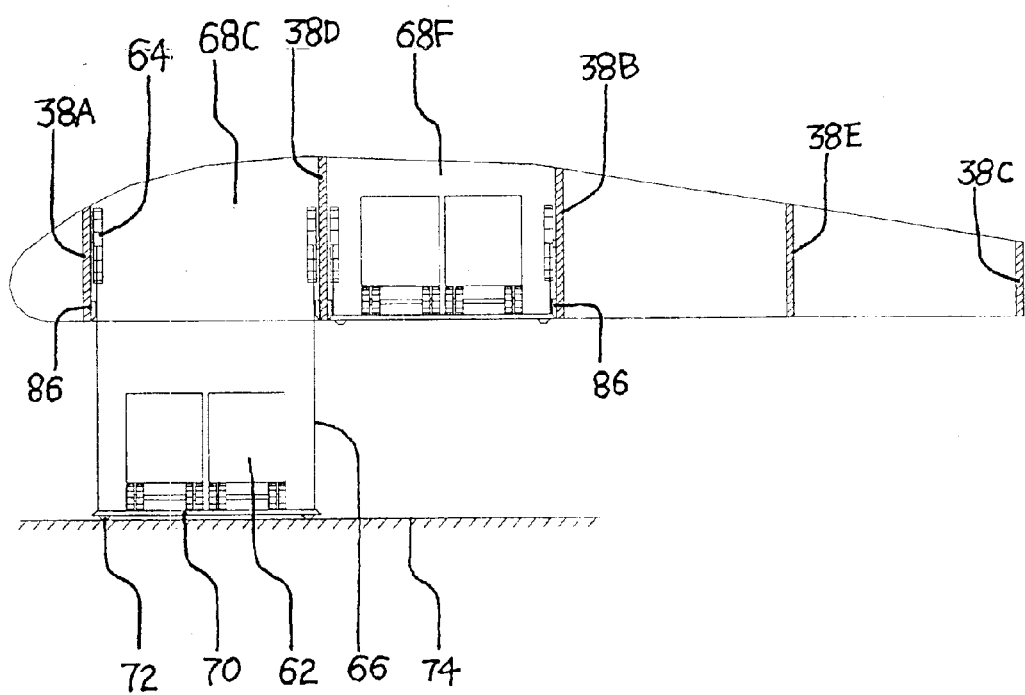
FIG. 6 shows the side sectional view of two cargo compartments of the aircraft and how the load/unload system works.

FIG. 6 is a cross-section view taken from line 6—6 of FIG. 5B. This fig shows additional detail of cargo hoister systems 64 and pallet 70. The pallet of cargo compartment 68C is lowered onto ground by cargo hoister system 64. The pallet has feet 72 to help it stands firmly on the ground. The cargos, which are standard-size truck trailers 62 shown in the fig, can roll on or roll off the pallet. The pallet of cargo compartment 68F is hoisted up by hoister system 64 and is locked onto wing spars and ribs by pallet locking systems 86. At the upper position, the lower surface of the pallet also forms the lower surface of wing 34.

DETAILED DESCRIPTION OF THE INVENTION—ALTERNATIVE EMBODIMENTS

Tourism/Passenger Version

Figure 7:
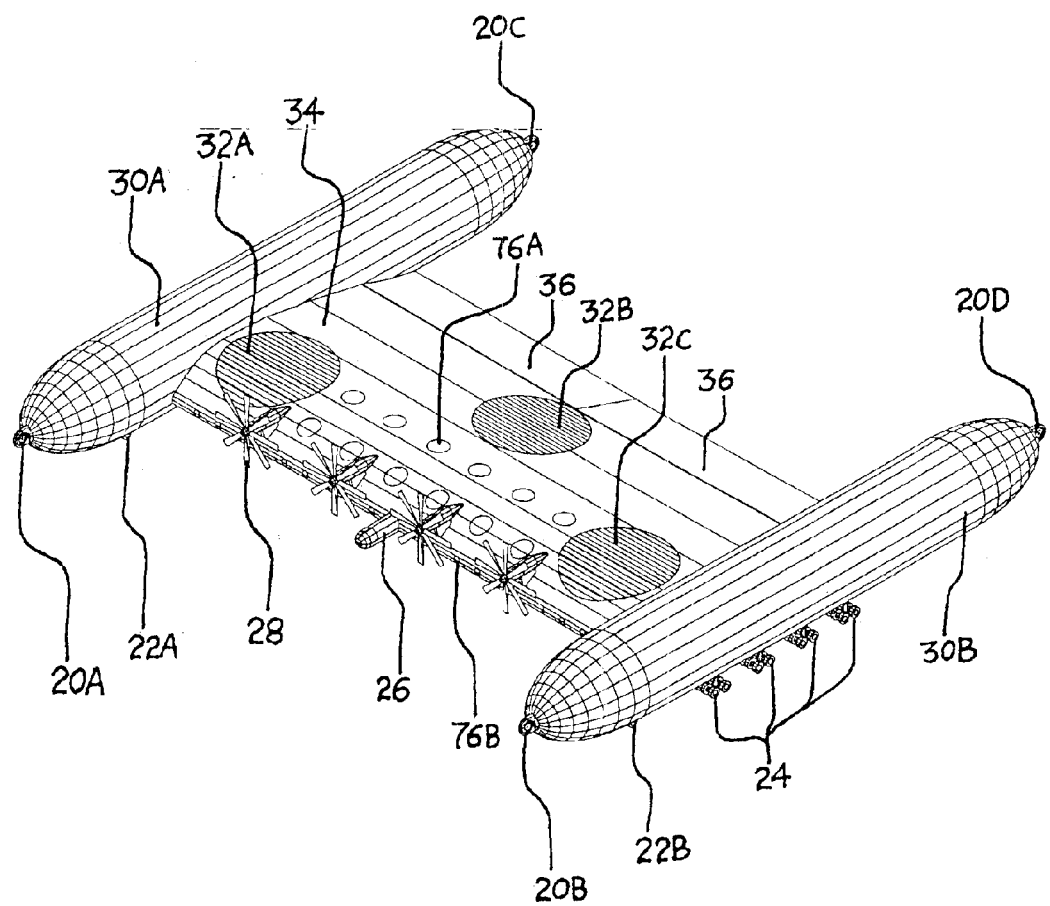
FIG. 7 shows the isometric view of an aircraft according to the invention in a passenger/tourism version that has V/STOL capability.

FIG. 7 is an isometric view of a Tourism/Passenger Hybrid Flying Wing aircraft according to the invention. Viewing windows 76A and 76B are installed on both the upper surface and leading edge of wing 34. If needed, viewing windows can also be installed on the lower surface of the wing.

The aircraft's major advantages for tourism are:
1. The huge payload capability and large internal spaces make the aircraft able to arrange facilities like bedrooms, scenery dinning rooms, etc. that conventional aircraft do not have.
2. The high cruise efficiency and huge fuel capacity of the aircraft makes it able to fly for a long period of time.
3. V/STOL capability makes the aircraft able to take tourists to remote sites where other transportation means cannot reach.
4. The aircraft can help the tourism industry to be more environment-friendly. This is because the aircraft can take tourists reach places without needs to build roads to disturb wild lives.

The above-mentioned advantages makes it possible to use Hybrid Flying Wing aircraft as flying cruisers and open up a new industry of aerial tourism.

The aircraft's major advantages for passengers are:
1. The huge payload capability and big internal spaces make the aircraft able to take passengers with very big luggage. For example, passengers can fly with their cars.
2. V/STOL capability makes the aircraft able to transport its passengers and their luggage to remote places where other means of transportations cannot reach.

In general, the low cost, huge payload, and V/STOL capabilities of Hybrid Flying Wing aircraft make it attractive to tourism and passengers.

Different Number of Lift-Fan Propulsion Systems

Figure 8:
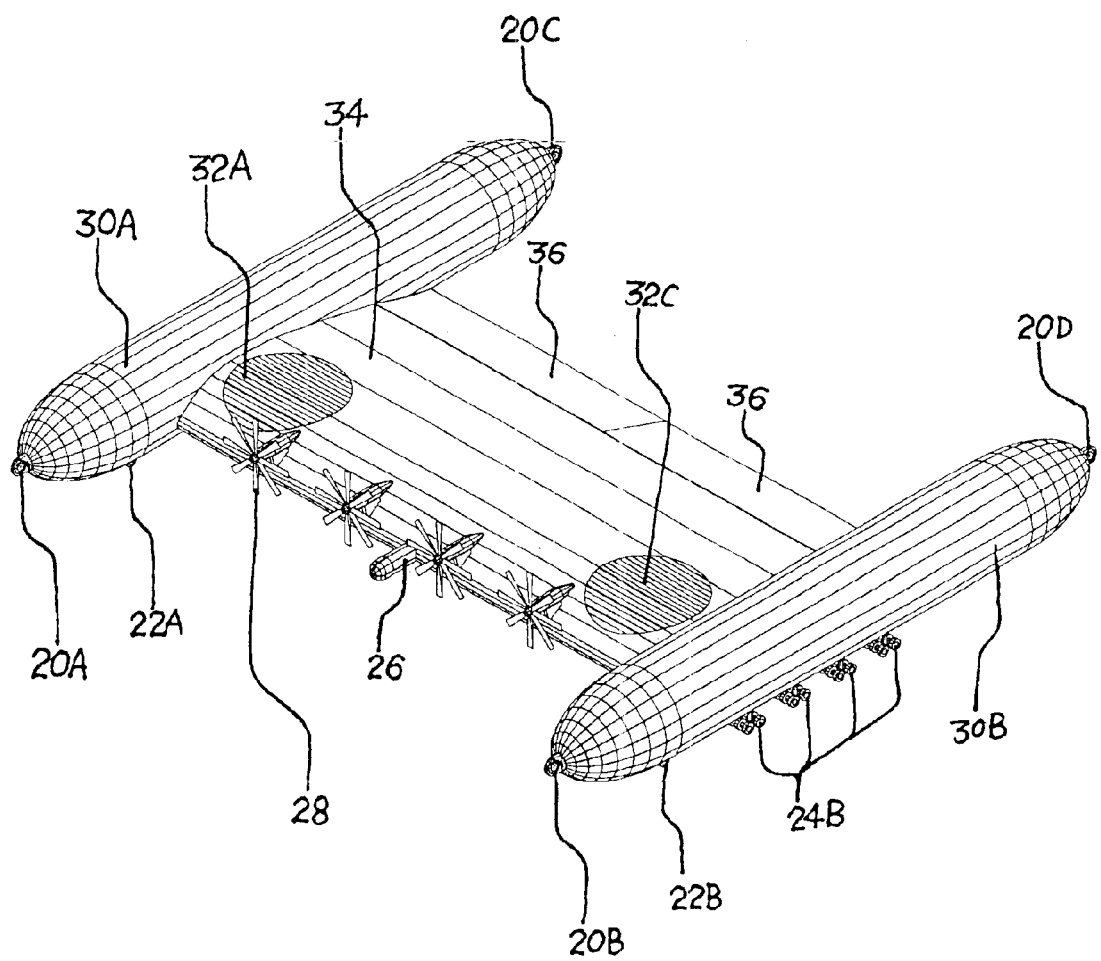
FIG. 8 shows the isometric view of an aircraft with an alternative arrangement of liftfan propulsion systems according to the invention in a cargo version that has V/STOL capability.

FIG. 8 is an isometric view of an aircraft having two lift-fan propulsion systems installed on wing 34. These two lift-fan propulsion systems provide thrust as well as roll stability and control during V/STOL and hovering. The pitch balance and control of the aircraft during the above-mentioned flight conditions are provided by wingtip hulls 30A and 30B. Both wingtip hulls can use mechanisms similar to airships' trim control methods. That is, wingtip hulls 30A and 30B achieve the pitch control by adjusting the lifts generated by the forward and after ballonet systems inside them. For example, if the aircraft needs to nose-up, both wingtip hulls can increase the lift of their forward ballonet systems by enlarging their volumes and decrease the lift of after ballonet systems by reducing their volumes.

The major advantages of this arrangement are that the aircraft not only saves weight and cost by eliminating one lift-fan propulsion system but also expands its internal spaces for more payload and fuel.

Figure 9:
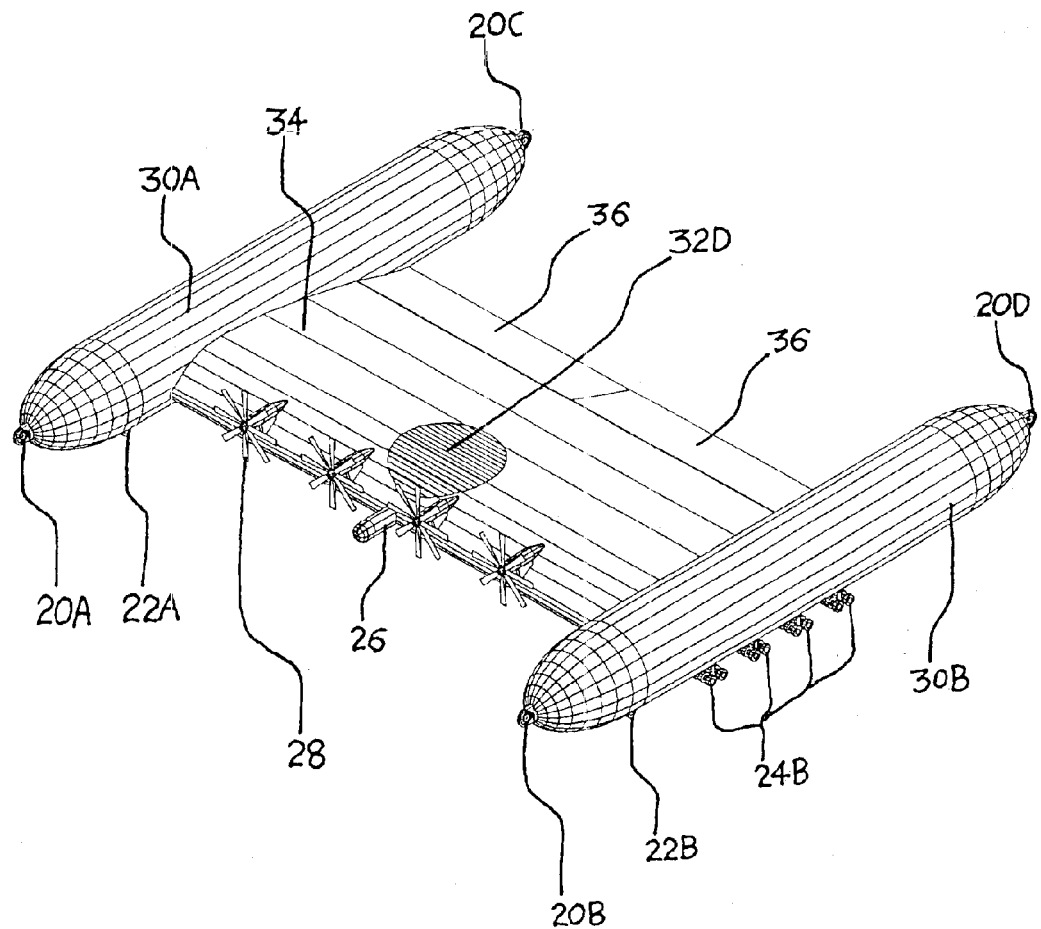
FIG. 9 shows the isometric view of an aircraft with another alternative arrangement of lift-fan propulsion system according to the invention in a cargo version that has V/STOL capability.

FIG. 9 is an isometric view of an aircraft having one lift-fan propulsion system. In this design, the wingtip hulls 30A and 30B provide both roll and pitch stability and control during V/STOL and hovering. Wingtip hulls 30A and 30B can achieve the controls by adjusting the lifts generated by the forward and after ballonet systems inside them. For example, if the aircraft needs to bank to the left side, it can increase the lift generated by the right wingtip hull 30A by enlarging the volumes of both the front and after ballonet systems of wingtip hull 30A, and decrease the lift generated by left wingtip hull 30B by reducing the volumes of both the front and after ballonet systems of wingtip hull 30B.

This configuration further reduces weight and cost of the aircraft, and provides even more internal spaces for payload and fuel comparing with Hybrid Flying Wing aircraft having two lift-fan propulsion systems.

Conventional Take-Off and Landing Hybrid Flying Wing Aircraft

Figure 10:
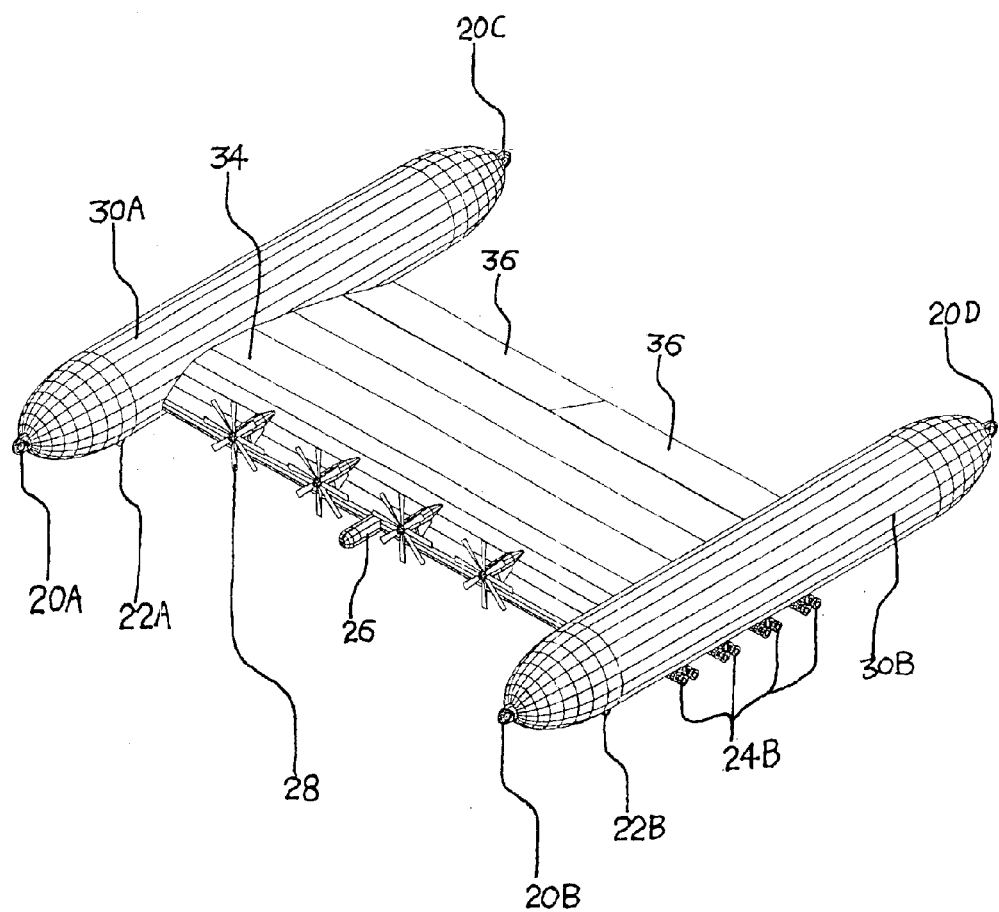
FIG. 10 shows the isometric view of an aircraft according to the invention in a cargo transport version that has conventional take-off and landing capability.

FIG. 10 is an isometric view of a Hybrid Flying Wing aircraft that only has conventional take-off and landing capability. This aircraft is attractive because its procurement and operational costs are lower than those Hybrid Flying Wing aircraft that have V/STOL capability, and its high-efficient lift-generating configuration makes it able to take-off and land on short, rough, and dirt runways.

Hybrid Flying Wing Aircraft with Additional Control Surfaces

Figure 11:
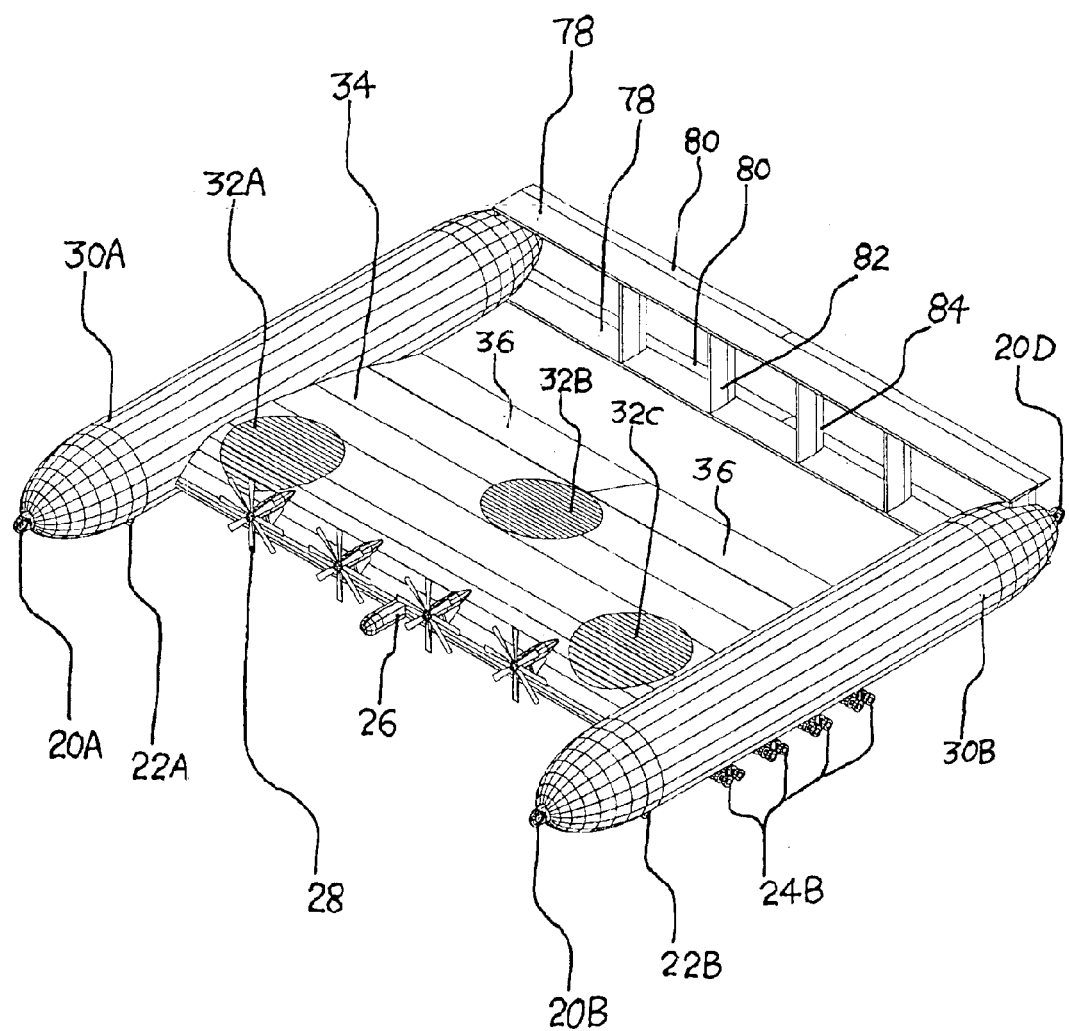
FIG. 11 shows the isometric view of an aircraft with an alternative arrangement of controlling surfaces according to the invention in a cargo transport version that has V/STOL capability.

FIG. 11 is an isometric view of a V/STOL Hybrid Flying Wing aircraft with horizontal tails 78 and vertical tails 82 installed. Elevators 80 and rudders 84 are installed on the horizontal and vertical tails respectively. These additional control surfaces can help the aircraft achieve flight control if required.

Figure 12:
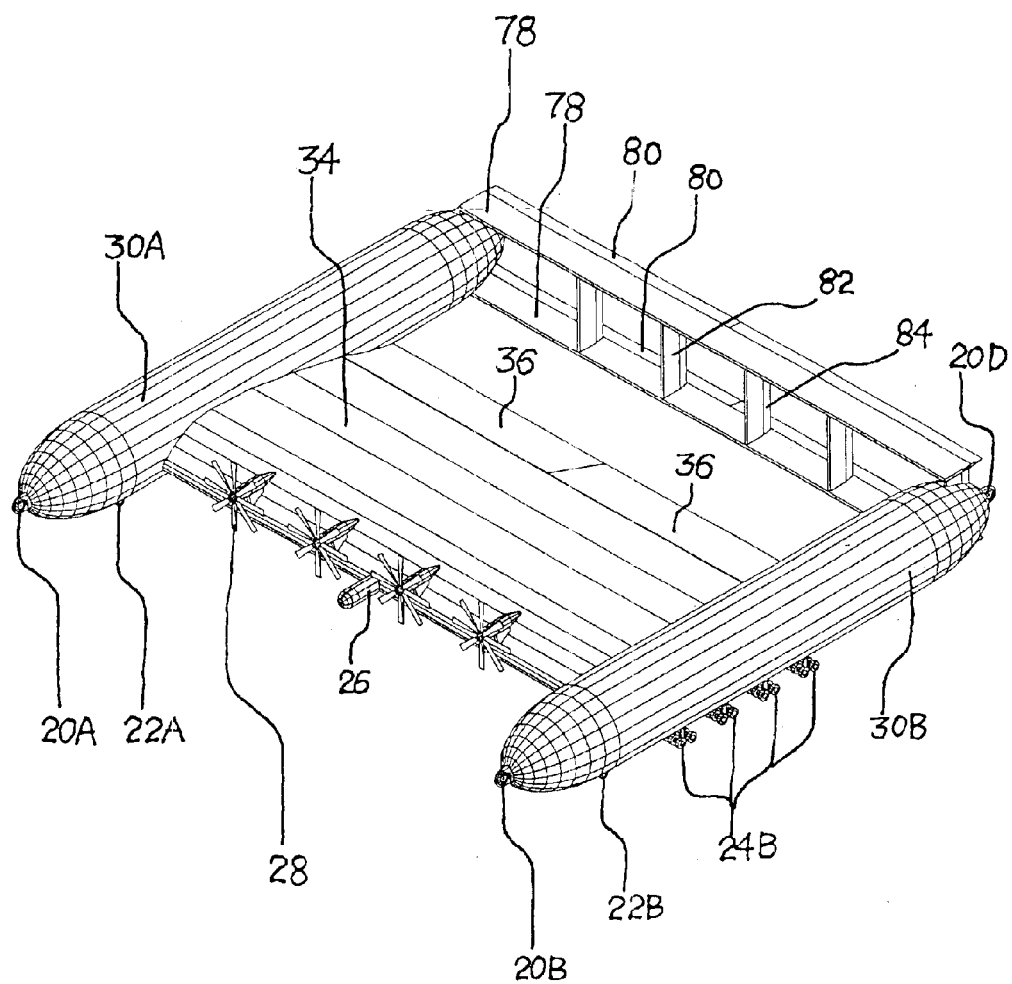
FIG. 12 shows the isometric view of an aircraft with an alternative arrangement of controlling surfaces according to the invention in a cargo transport version that has conventional takeoff and landing capability.

FIG. 12 is an isometric view of a conventional take-off and landing Hybrid Flying Wing aircraft with additional control surfaces.

The arrangement of the controlling surfaces shown in the above-mentioned figs is only one of many ways to install controlling surfaces onto the aircraft.

DETAILED DESCRIPTION OF THE INVENTION—CONCLUSION, RAMIFICATIONS, AND SCOPE

Accordingly, the reader will see that the Hybrid Flying Wing aircraft of this invention can transport payload in a highly flexible and cost-effective way. Its high flexibility is achieved by its capability to transport payload of huge weight and big dimensions, its ability to quickly load/unload with little ground support, and its V/STOL ability on unpaved, unprepared grounds. The high flexibility can be realized in a cost-effective way because it can cruise with high efficiency, its configuration greatly reduces concentration of structural stress so that simple, conventional, and low cost structures can be used, and its flight control can be achieved with systems that are easy to develop and operate.

Furthermore, the Hybrid Flying Wing aircraft has additional advantages in that,
1. Its simple structure makes possible that the aircraft can have modular payload compartments so that it can quickly change from one version to another. For example, to interchange among solid cargo, liquid cargo, and passenger versions, etc.;
2. When using as a fire fighting aircraft, the aircraft has the capability to terminate forest fire that no existing aircraft can match. It can hover over a water surface, pump substantial amount of water into its water compartments, then fly over the fire and release hundreds tons of water;
3. Its large size makes the aircraft able to house huge antennas, sophisticated equipment, and personnel flying long hours in the air.

Although the description in the above summary and descriptions contains many specificities, these should not be construed as limiting the scope of the invention but as merely providing illustrations of some of the presently preferred embodiments of this invention. For example, the cockpit can be located in other places like under the nose of one wingtip hull; the landing gears can be installed under the wing, or are not retractable, and the forward propulsion systems can be installed on the wingtip hulls, etc. On the contrary, within the scope of protection, the aircraft according to the invention may also assume embodiments other than those described above. In this case, the aircraft may, in particular, have features that constitute a combination of the respective individual features of the claims.

I claim:

1. An air vehicle comprising:

(a) one and only one main wing means for both generating aerodynamic lift and carrying payload, and (b) said main wing means having a wing shape of a straight wing, and (c) at least one internal payload cabin means for carrying payload being constructed inside said main wing means, and (d) said main wing means having two wingtips which being the two tips of said main wing means, and (e) at least one buoyancy hull means for generating static lift by containing lighter-than-air gas being installed at each of said two wingtips, and (f) said main wing means having said buoyancy hull means installed at both of its said wingtips only and no other part of said main wing means being installed with said buoyancy hull means, and (g) at least one propeller means for generating forward-flying thrust being connected to said main wing means, and (h) each of said propeller means rotating around an axis of rotation, and (i) said axis of rotation extending toward the forward flying direction of said air vehicle in a way that when said air vehicle cruising horizontally, there being a first angle between said axis of rotation and a horizontal plane, and there being a second angle between said axis of rotation and a vertical line, and the sum of said first angle and said second angle being 90°, and said first angle being smaller than said second angle.

2. The air vehicle of claim I wherein at least one fan means for generating lifting thrust during take-off and landing being installed inside said main wing means and said fan means rotating around at least one rotation-axis, and each of said at least one rotation-axis having fixed direction.

* * * * *